United States Patent [19]
Martinez

[11] Patent Number: 6,003,611
[45] Date of Patent: Dec. 21, 1999

[54] CURB SUPPORT ROLLER FOR A VERTICAL DRIVE SHAFT LAWN EDGER

[75] Inventor: David M Martinez, Brunswick, Ohio

[73] Assignee: MTD Products Inc., Cleveland, Ohio

[21] Appl. No.: 09/002,557

[22] Filed: Dec. 31, 1997

[51] Int. Cl.[6] .......................... A01D 34/47; A01D 34/62
[52] U.S. Cl. ............................................. 172/15; 172/17
[58] Field of Search ........................................ 172/17, 15

[56] References Cited

U.S. PATENT DOCUMENTS

| | | | |
|---|---|---|---|
| 4,182,100 | 1/1980 | Letter | 172/17 X |
| 4,962,631 | 10/1990 | Braun et al. | 172/17 X |
| 5,301,757 | 4/1994 | Kelley, Jr. | 172/15 |
| 5,355,597 | 10/1994 | Pollard | 172/15 X |
| 5,540,286 | 7/1996 | Helmig | 172/15 |
| 5,826,667 | 10/1998 | Notaras et al. | 172/17 X |

FOREIGN PATENT DOCUMENTS 1260223  2/1968  Germany ................................. 172/17

OTHER PUBLICATIONS

Mantis "The Mantis–20 Garden and Lawn Care System", Mantis Manufacturing Co., Oct. 1985.

*Primary Examiner*—Christopher J. Novosad
*Attorney, Agent, or Firm*—Emerson & Associates; Roger D. Emerson; John M. Skeriotis

[57] ABSTRACT

A vertical drive shaft lawn edger is disclosed having a curb support roller system. A support roller is mounted directly behind the blade of the lawn edger. A height adjustment mechanism controls the height of the front wheel and the support roller in unison. The support roller has a smaller outer diameter than the front and rear wheels. Therefore, when edging along side a curb the support roller contacts the curb thereby providing support when the front wheel is suspended above the ground.

14 Claims, 4 Drawing Sheets

CURB SUPPORT ROLLER FOR A VERTICAL DRIVE SHAFT LAWN EDGER

BACKGROUND OF THE INVENTION

I. Field of the Invention

This invention relates to a lawn edger and more specifically, to a curb support roller for a vertical drive shaft lawn edger.

II. Description of the Related Art

The present invention contemplates a new and improved curb support roller for a vertical drive shaft lawn edger that is simple in design, effective in use, and overcomes the foregoing difficulties and others while providing better and more advantageous overall results.

Lawn edgers are widely used in maintaining the appearance of lawns. They are primarily used to trim grass along the edges of driveways and curbs.

The prior art edgers typically use a horizontal output shaft that rotates a vertical cutting blade. Through the use of a V-belt, a vertical drive pulley rotates a vertical driven pulley. The driven pulley rotates a vertical edger blade, which has a horizontal rotational axis. A vertical drive shaft engine has a horizontal driven pulley with its rotational axis vertical. In this arrangement, the V-belt is twisted to translate the vertical rotation of the drive pulley to the horizontal rotation of the driven pulley. The horizontal drive shaft engine configuration is preferred since the pulleys and the blade are oriented uniformly. However, lawn edgers with a horizontal drive shaft engine are relatively expensive. Lawn mower engines utilize a vertical drive shaft. Because engines or lawn mowers are manufactured in greater numbers, they are less expensive. Therefore, lawn edgers utilizing a vertical drive shaft are desirable, for other reasons in addition to their low cost.

Prior art lawn edgers typically use a three or four-wheeled system to provide stability. However, when using the prior art edgers on inclined surfaces, such as a curbs, the edgers tend to be hard to control. In these conventional edgers some sort of shock means or wheel extension is used to provide stability.

In the typical lawn edger configuration, the rotational axes of the front wheels are substantially in line with the rotational axis of the cutting blade. Prior art vertical drive shaft lawn edgers have the front wheels beside the cutting means. This configuration leads to the edger being unstable while edging along a curb. In operation, the edging or cutting means follows a path along the edge of the grass. Meanwhile, the front wheels follow a path parallel to this grass edge path. Typically, the front wheels do not contact the ground, as the rear wheels and edging means support the edger. While this arrangement has been adequate, the inventive arrangement is believed to offer advantages.

SUMMARY OF THE INVENTION

In accordance with the present invention, a new and improved support system for a vertical drive shaft lawn edger is provided which improves the stability of the lawn edger.

An improved lawn edger having an engine with a vertical drive shaft having a front and rear defining afore and aft direction is disclosed. The vertical drive shaft lawn edger has a flywheel and drive pulley mounted to the engine. A driven pulley is driven by the flywheel and drive pulley. A V-belt extends around the drive pulley to drive the driven pulley. A belt edger guard contains the driven pulley and the V-belt.

A frame has front and rear portions, sides, and a center hole. The front and rear portions are downturned. The center hole accepts the engine, which is mounted to the frame via three mounting holes.

An edging means is mounted to the front portion of the frame and is secured to a bearing housing. The edging means has a blade, a blade guide, and a blade guard. The belt edger guard, the bearing housing, and the blade guide are secured together.

A rear axle is mounted to the rear portion of the frame and extends through the sides of the frame. The rear axle has a first and second end and a midpoint. The rear axle is seated within bushing mounts and rotates within them.

A set of rear wheels is mounted to the rear axle. Each of the wheels has a centerline running through its center. The front wheel has an outer diameter and is displaced with respect to the midpoint of the rear axle. A pivotal mounting bracket pivotally mounts the front wheel to the front portion of the frame.

A curb wheel support assembly is disclosed having a pivoting rod, and two pivot arms. A support roller is mounted to the front portion of the frame and rearward of the edging means by the curb wheel support assembly. One of the pivot arms has a short axle in which the support roller rotates about. The pivot arms are rigidly fastened to the pivoting rod. The support roller centerline runs through a center of the support roller and is in line with the centerline of one of the rear wheels. The outer diameter of the support roller is less than the outer diameter of the front and rear wheels. The support roller has means to cooperate with the height of the front wheel whereby the means for adjusting the height of the front wheel simultaneously adjusts the height of the support roller.

A lever assembly comprises a lever, a lever pivot arm, and indexing plate. The indexing plate is mounted to the frame. The lever pivot arm is mounted to the indexing plate. The lever assembly adjusts the height of the front wheel while simultaneously adjusting the height of the support roller.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
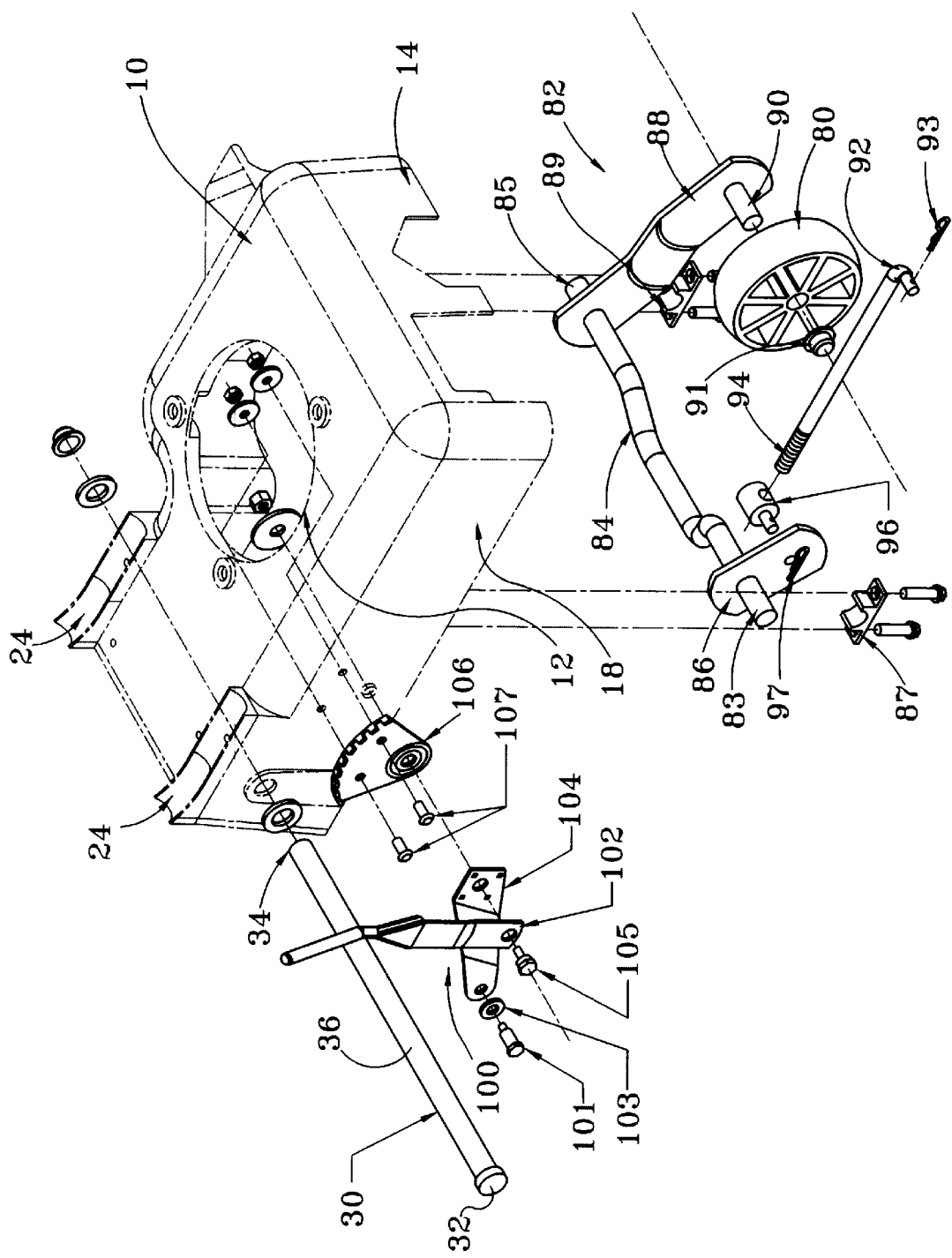
FIG. 1 is an exploded perspective view of the present invention.
Figure 2:
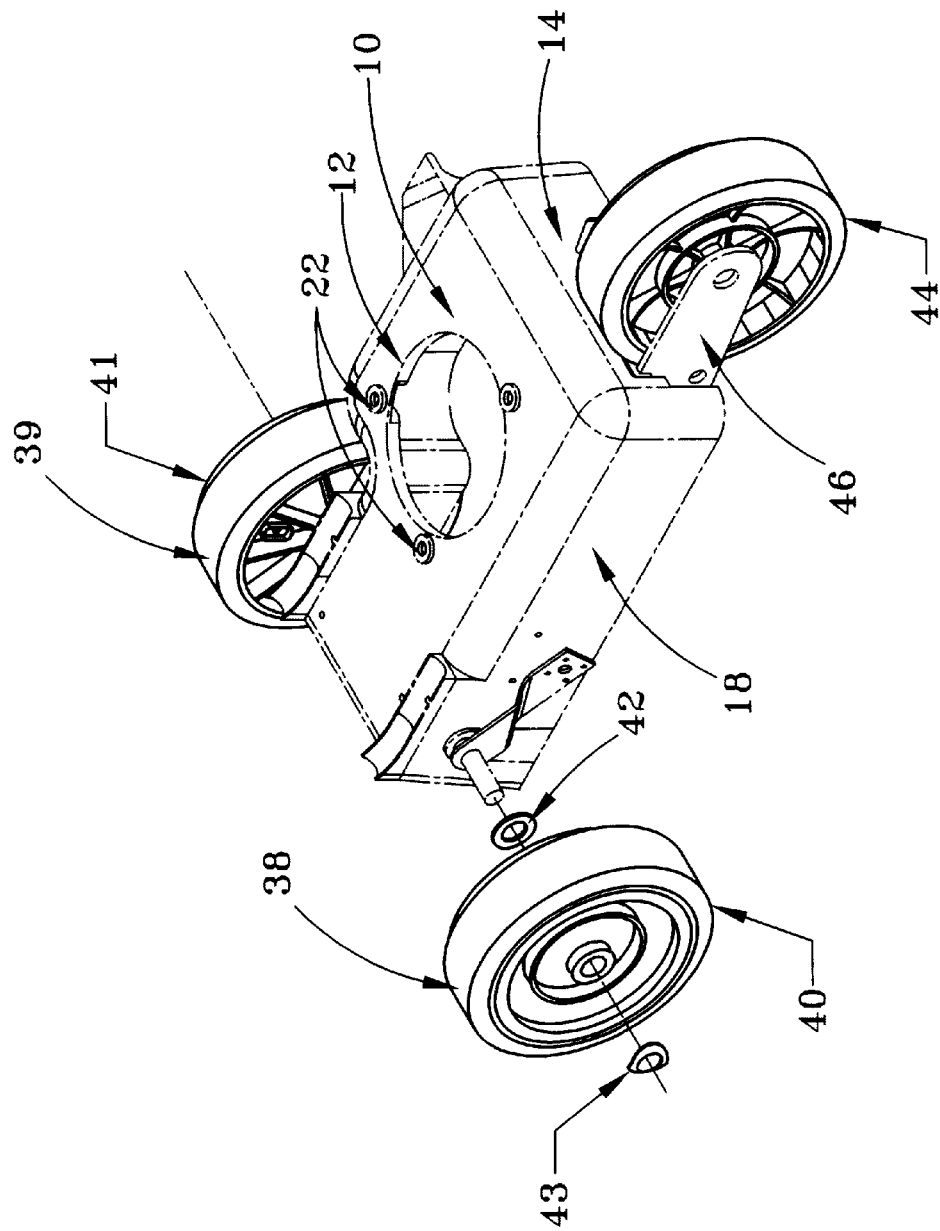
FIG. 2 is a perspective view showing the front and a rear wheel attached to the frame.
Figure 4:
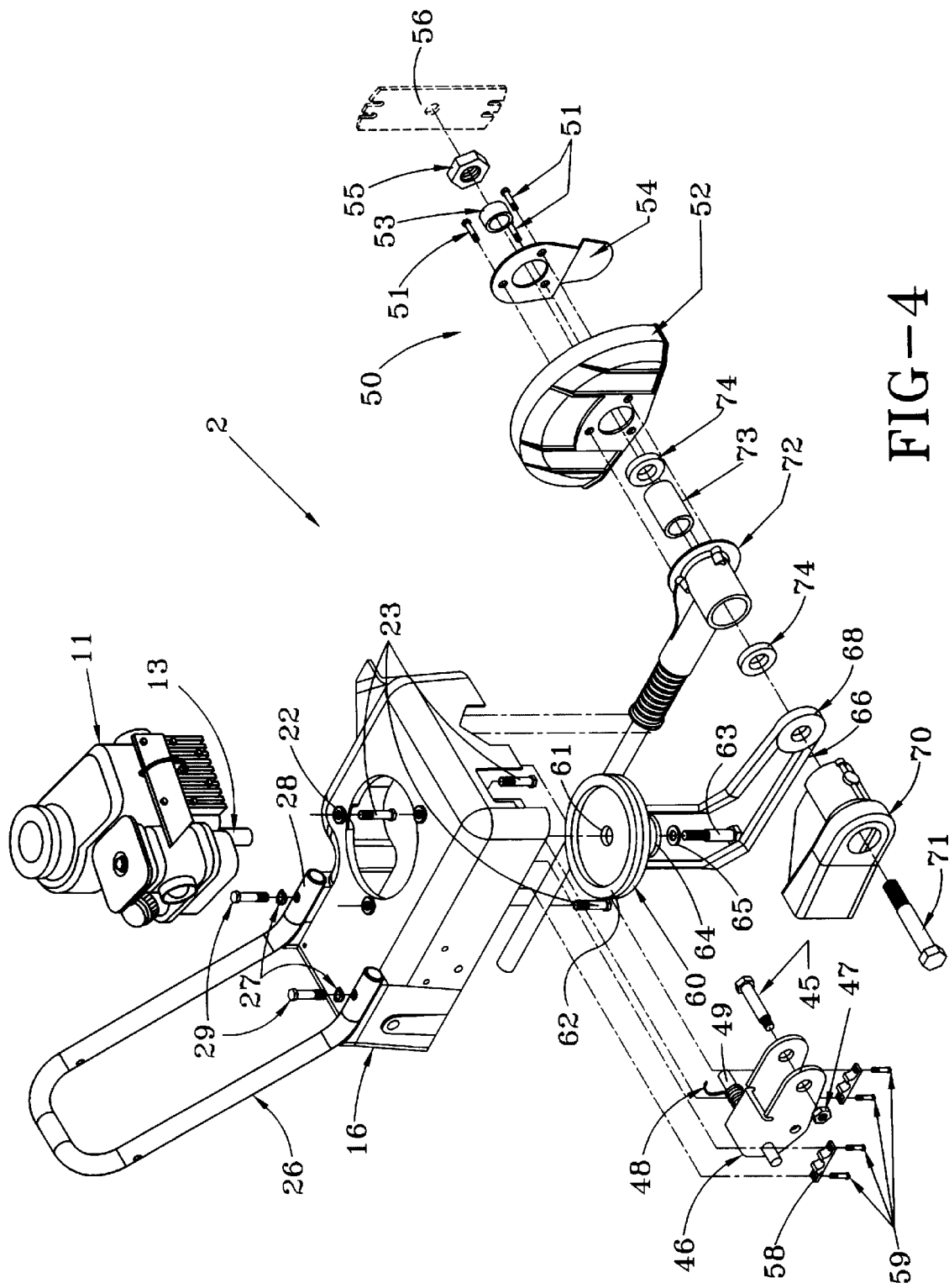
FIG. 4 is an exploded perspective view showing the drive pulley and edging means.

Referring now to the drawings, which are for purposes of illustrating a preferred embodiment of the invention only, and not for purposes of limiting the invention, FIG. 1 shows an exploded perspective view of a curb support roller assembly 82 for a vertical drive shaft lawn edger 2 (shown in FIG. 4). The vertical drive shaft edger 2 has a frame 10 that accepts an engine 11 within a hole 12 in the frame 10. The frame 10 has downturned front and rear portions 14, 16. A rear axle 30 extends through the side portions 18, 20 of the frame 10. The rear axle 30 has first and second ends 32, 34 and a midpoint 36. The midpoint is located halfway between the first and second ends 32, 34. With reference to FIG. 2, the rear wheels 40, 41 are mounted to the axle using a washer 42 and push cap 43. A front wheel 44 is pivotally mounted to the frame 10 by a pivotal mounting bracket 46. The front wheel 44 is displaced with respect to the midpoint 36 of the rear axle 30. In the preferred embodiment, the outer diameters of the rear wheels 40, 41 are equal to the outer diameter of the front wheel 44. The outer diameter of the support roller 80 is less than the outer diameters of the wheels 40, 41 and 44. It is important in that the support roller 80 can maintain contact with a curb when the front wheel 44 is not touching the ground to the angled contact surface.

With reference to FIG. 2, the frame 10 has engine mounts 22. The engine 11 mounts to the frame 12 by means known within the art. The vertical drive shaft 13 of the engine 11 extends vertically downward within the hole 12 of the frame 10. As shown in FIG. 4, drive pulley 64 is typically mounted to the end of the drive shaft 13 and includes a belt 66 to drive an edging means 50. The engine 11 mounts to the frame 10 via engine mounts 22 and is secured by screws 23.

With reference to FIGS. 1 and 4, the operator controls the movement of the lawn edger by a handle 26. The frame 10 has handle rest portions 24 whereby arms 28 of the handle 26 are mounted. Screws 29 along with saddle washers 27 secure the arms 28 to the frame 10.

The engine 11 has a vertical drive shaft 13 that extends into a center hole 61 of a flywheel and pulley assembly 60. The flywheel and pulley assembly 60 is securely mounted to the drive shaft 13 and is rotated by the drive shaft 13. The flywheel 62 has a pulley 64 at its lower portion. A screw 63 and washer 65 secure the flywheel and pulley assembly 60 to the drive shaft 13. A belt 66 extends around the drive pulley 64 and also around a driven pulley 68. The driven pulley 68 drives a blade 80 of an edging means 50. The driven pulley 68 and a portion of the belt 66 are guarded by a belt edger guard 70. A screw 71 secures the belt edger guard 70 to the driven pulley 68. The edging means 50 is secured to a bearing housing 72. A spacer 73 and bearings 74 are seated within the bearing housing 72.

The edging means 50 comprises a blade guard 52, a blade guide 54 and blade 56. The blade guide 54 is secured to the blade guard 52 by screws 51. A spacer 53 and nut 55 secure the belt edger guard 70, the driven pulley 68, the bearing housing 72, the blade guard 52 and the blade guide 54 together. The nut 55 screws onto the screw 71.

FIG. 4 shows the pivotal mounting bracket 46 that mounts the front wheel 44 to the frame 10. The mounting bracket 46 has a torsion spring 48 that seats along pin 49 of the mounting bracket 46. The front wheel 44 is secured to the mounting bracket 46 by shoulder screw 45 and nut 47. The shoulder screw 45 and a pin 49 ride within bushing mounts 58, which are secured to the frame 10 by screws 59.

With reference to FIG. 1, a support roller 80 is mounted to a curb wheel support assembly 82. The curb wheel support assembly 82 comprises a pivoting rod 84, and pivot arms 86, 88. Support roller 80 rotates about a short axle 90 of pivot arm 88. The support roller 80 is secured to the support axle 90 by push cap 91. The support roller 80 freely rotates upon axle 90. Pivoting arms 86 and 88 are rigidly secured to the pivoting rod 84. They do not freely rotate about their respective axes. As such, upon rotation of pivoting rod 84, pivot arms 86, 88 are raised. A link rod 92 is secured to the pivotal mounting bracket 46 by a cotter pin 93. The threaded end 94 of the link rod 92 is threadedly engaged with a ferrule 96. The ferrule 96 is secured to the pivoting arm 86 by cotter pin 97. Ends 83, 85 of pivoting rod 84 freely rotate within bushing mounts 87, 89, which mount the curb wheel support assembly 82 to the frame 10. Upon rotation of the pivoting rod 84, the link rod 92 raises the front wheel 44 while the pivoting arm 88 raises the support roller 80 in unison. Therefore, as the front wheel 44 is raised and/or lowered the support roller 80 is simultaneously adjusted as well.

A lever assembly 100 accomplishes the raising and lowering of the front wheel 44 and support roller 80. The lever assembly 100 is comprised of a lever 102, a lever pivot arm 104 and an indexing plate 106. The indexing plate 106 is mounted to the frame 10 by screws 107. The lever pivot arm 104 mounts to the indexing plate 106 by shoulder screw 105 which secures the lever 102 to the lever pivot arm 104. A shoulder screw 101 and a washer 103 further attach the lever pivot arm 104 to the frame 10. As means known within the art, lever assembly 100 is connectedly linked to the curb wheel support assembly 82. In the preferred embodiment, the curb wheel support assembly 82 acts as a height raising means for the front wheel 44 and support roller 80.

Figure 3:
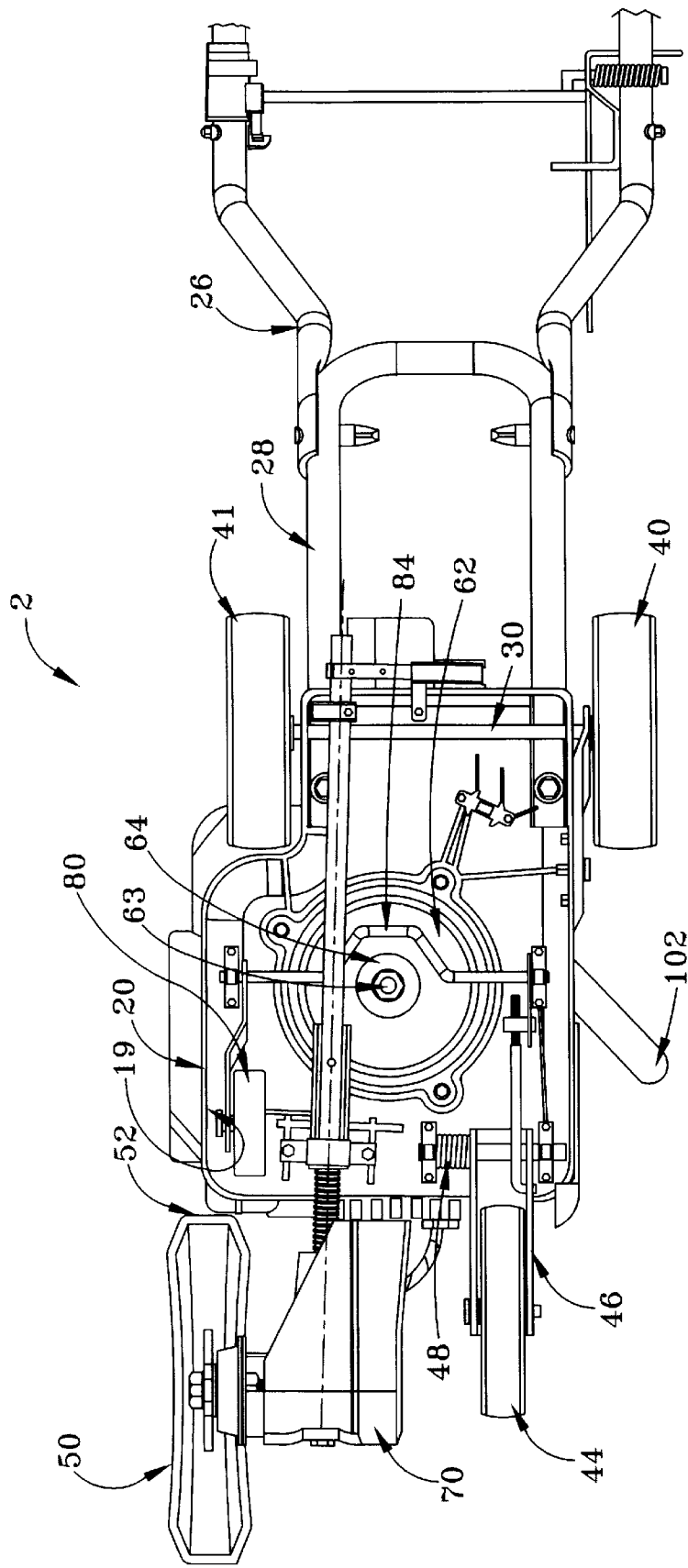
FIG. 3 is a top view of the present invention.

As shown in FIG. 3, the support roller 80 is positioned behind the edging means 50 and, more specifically, the blade guard 52. This arrangement allows for better support of the lawn edger while edging along a curb or an inclined surface. The support roller 80 helps to support the edging means 50 and hence, the lawn edger. The support roller 80 is more specifically situated behind the edging means 50 and on the inner portion 19 of the second side 20. The support roller 80 could also be located directly behind and in-line with the rotational axis of the edging means 50. This would allow more of an in-line assembly. However, this would require the frame 10 to be extended.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

I claim:

1. A lawn edger having a front and rear defining fore and aft directions, said lawn edger comprising:

a frame having a front, side and rear portions, a center hole, and front and rear downturned portions;

an engine mounted to said frame, said engine having a vertical drive shaft, said center hole of said frame accepting said engine;

a rear axle mounted to said rear portion of said frame, said rear axle having a first and second end and a midpoint;

a set of rear wheels mounted to said rear axle;

one front wheel mounted to said front portion of said frame and having a height, said front wheel being displaced with respect to said midpoint of said rear axle;

adjustment means to adjust said height of said front wheel; and, a support roller mounted to said front portion of said frame and within said frame and having a height, said support roller having cooperating means to cooperate with said height of said front wheel whereby said means for adjusting said height of said front wheel simultaneously adjusts said height of said support roller.

2. The lawn edger as recited in claim 1 wherein said front wheel and rear wheels and said support roller have diameters, said diameter of said support roller being less than said diameter of said front and rear wheels.

3. The lawn edger as recited in claim 1 wherein said support roller is mounted to said frame by a curb wheel support assembly, said curb wheel support assembly comprising a pivoting rod and pivot arms to pivot said support roller.

4. The lawn edger as recited in claim 1 wherein said adjustment means for adjusting said height of said front wheel comprises a lever mounted to said frame.

5. A lawn edger having a front and rear defining fore and aft directions, said lawn edger comprising:

a frame having a front, side and rear portions, a center hole, and front and rear downturned portions;

an engine mounted to said frame, said engine having a vertical drive shaft, said center hole of said frame accepting said engine;

an edging means mounted to said front portion of said frame;

a rear axle mounted to said rear portion of said frame, said rear axle having a first and second end and a midpoint;

a set of rear wheels mounted to said rear axle, said rear wheels each having a centerline;

one front wheel mounted to said front portion of said frame and having a height; and, a support roller mounted to said frame and within said frame and rearward of said edging means.

6. The lawn edger as recited in claim 5 wherein said front wheel is displaced with respect to said midpoint of said rear axle.

7. The lawn edger as recited in claim 5 further comprising adjustment means to adjust said height of said front wheel.

8. The lawn edger as recited in claim 7 wherein said support roller has cooperating means to cooperate with said height of said front wheel and whereby said adjustment means for adjusting said height of said front wheel simultaneously adjusts said height of said support roller.

9. The lawn edger as recited in claim 8 wherein said adjustment means for adjusting said height of said front wheel comprises a lever mounted to said frame.

10. The lawn edger as recited in claim 5 wherein said front and rear wheels and said support roller have diameters, said diameter of said support roller being less than said diameter of said front and rear wheels.

11. The lawn edger as recited in claim 5 wherein said support roller is mounted to said frame by a curb wheel support assembly, said curb wheel support assembly comprising a pivoting rod and pivot arms to pivot said support roller.

12. The lawn edger as recited in claim 5 wherein said support roller has a centerline running through a center of said support roller and said centerline is coaxial with said centerline of one of said rear wheels.

13. A lawn edger having a front and rear defining fore and aft directions, said lawn edger comprising:

a frame having a front and rear portion;

an engine mounted to said frame, said engine having a vertical drive shaft;

an edging means mounted to said front portion of said frame;

a rear axle mounted to said rear portion of said frame, said rear axle having a first and second end and a midpoint;

a set of rear wheels mounted to said rear axle, said rear wheels each having a centerline;

one front wheel mounted to said front portion of said frame and having a height, said front wheel being displaced with respect to said midpoint of said rear axle;

adjustment means to adjust said height of said front wheel;

a support roller mounted to said frame rearward of said edging means and within said frame, said support roller having a height and means to cooperate with said height of said front wheel; and, whereby said means for adjusting said height of said front wheel simultaneously adjusts said height of said support roller; and said rear wheels and said support roller support said lawn edger and said front wheel being suspended above the ground when said lawn edger is used in association with a curb.

14. A lawn edger, comprising:

an engine with a vertical drive shaft;

a front and rear, defining fore and aft directions;

a flywheel mounted to said engine;

a drive pulley mounted to said engine;

a driven pulley, said driven pulley driven by said flywheel and drive pulley;

a V-belt extending around said driven pulley and said drive pulley;

a belt edger guard, said driven pulley and said V-belt being contained within said belt edger guard;

a frame having a front, side and rear portions, a center hole, and front and rear downturned portions, said center hole accepting said engine;

a bearing housing;

edging means mounted to said front portion of said frame and secured to said bearing housing, said edging means having a blade, a blade guide, and a blade guard, said belt edger guard, said bearing housing, and said blade guide being secured together;

bushing mounts mounted to said frame;

a rear axle mounted to said rear portion of said frame, said rear axle having a first and second end and a midpoint, said rear axle extending through said side portions of said frame;

a set of rear wheels mounted to said rear axle, each having a centerline and a diameter;

one front wheel having a height and an outer diameter, said front wheel being displaced with respect to said midpoint of said rear axle;

a pivotal mounting bracket, said pivotal mounting bracket pivotally mounting said front wheel to said front portion of said frame;

means to adjust said height of said front wheel;

a curb wheel support assembly, said curb wheel support assembly having a pivoting rod, and two pivot arms, one of said pivot arms having an axle, said pivot arms rigidly fastened to said pivoting rod;

a support roller, said support roller rotating about said axle of said pivot arm, said support roller mounted to said front portion of said frame and rearward of said edging means by said curb wheel support assembly, said support roller having a height, a centerline, and a diameter, said front and rear wheels and said diameter of said support roller being less than said diameter of said front and rear wheels, said centerline of said support roller is parallel to said centerline of said one of said rear wheels, said support roller having means to cooperate with said front wheel, whereby said means for adjusting said height of said front wheel simultaneously adjusts said height of said support roller; and, a lever assembly, said lever assembly having a lever, a lever pivot arm, and an indexing plate, said indexing plate mounted to said frame, said lever pivot arm mounted to said indexing plate, whereby said lever assembly adjusts said height of said front wheel, said lever assembly simultaneously adjusts said height of said support roller and said front wheel.

* * * * *